(12) United States Patent
Demirors et al.

(10) Patent No.: US 9,752,021 B2
(45) Date of Patent: Sep. 5, 2017

(54) ETHYLENE/ALPHA-OLEFIN INTERPOLYMER COMPOSITION

(71) Applicant: Dow Global Technologies LLC, Midland, MI (US)

(72) Inventors: Mehmet Demirors, Freeport, TX (US); Teresa P. Karjala, Lake Jackson, TX (US); Julie W. Mckenna, McKinney, TX (US); Douglas S. Ginger, Freeport, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 32 days.

(21) Appl. No.: 14/762,898

(22) PCT Filed: Mar. 13, 2014

(86) PCT No.: PCT/US2014/025304
§ 371 (c)(1),
(2) Date: Jul. 23, 2015

(87) PCT Pub. No.: WO2014/159844
PCT Pub. Date: Oct. 2, 2014

(65) Prior Publication Data
US 2016/0068667 A1 Mar. 10, 2016

Related U.S. Application Data

(60) Provisional application No. 61/806,103, filed on Mar. 28, 2013.

(51) Int. Cl.
*B32B 27/32* (2006.01)
*C08L 23/08* (2006.01)
(Continued)

(52) U.S. Cl.
CPC ........ *C08L 23/0815* (2013.01); *C08F 210/16* (2013.01); *C08J 5/18* (2013.01);
(Continued)

(58) Field of Classification Search
CPC ....... C08F 210/16; C08F 2410/04; C08J 5/18; C08J 2323/08; C08J 2423/06;
(Continued)

(56) References Cited

U.S. PATENT DOCUMENTS

| | | | | |
|---|---|---|---|---|
| 2004/0220367 | A1* | 11/2004 | Kanai | C08F 210/16 526/348.1 |
| 2008/0287634 | A1* | 11/2008 | Nieto | C08F 210/16 526/352 |
| 2011/0171407 | A1* | 7/2011 | Mazzola | C08F 8/30 428/36.9 |

FOREIGN PATENT DOCUMENTS

| WO | WO99/09096 | 2/1999 |
|---|---|---|
| WO | WO01/98409 | 12/2001 |

(Continued)

OTHER PUBLICATIONS

Chinese Office Action dated Sep. 30, 2016; from Chinese counterpart Application No. 201480014296.0.
(Continued)

*Primary Examiner* — Maria Veronica Ewald
*Assistant Examiner* — Travis Figg
(74) *Attorney, Agent, or Firm* — Husch Blackwell LLP

(57) ABSTRACT

The instant invention provides an ethylene/alpha-olefin interpolymer composition suitable for blown film applications, and blown films made therefrom. The ethylene/alpha-olefin interpolymer composition suitable for blown film applications according to the present invention comprises greater than 80 percent by weight of units derived from ethylene and 20 percent or less by weight of units derived (Continued)

from one or more alpha olefin co-monomers, wherein said ethylene/alpha-olefin interpolymer has a density in the range of from 0.910 to 0.918 g/cm$^3$, a melt index $I_2$ in the range of from 0.5 to 1.1 g/10 minutes, a melt flow ratio $I_{10}/I_2$ in the range of from 8 to 10, a melt strength in the range of from 3 to 6 cN, a highest temperature fraction in the range of from 11 to 14 percent determined by CEF, a highest peak temperature fraction by CEF in range of from 96 to 100° C., and a lowest temperature fraction from CEF in the range of from 2 to 5 percent, and a DSC heat curve having three melting peaks with a highest temperature melting peak in the range of from 120 to 124° C., a crystallinity in the range of from 40 to 50 percent.

17 Claims, 6 Drawing Sheets

(51) Int. Cl.
*C08F 210/16* (2006.01)
*C08J 5/18* (2006.01)

(52) U.S. Cl.
CPC ....... *C08F 2410/04* (2013.01); *C08J 2323/08* (2013.01); *C08J 2423/06* (2013.01); *C08L 2203/16* (2013.01); *C08L 2205/02* (2013.01); *C08L 2207/066* (2013.01)

(58) Field of Classification Search
CPC ............. C08L 23/0815; C08L 2203/16; C08L 2205/02; C08L 2207/066
See application file for complete search history.

(56) References Cited

FOREIGN PATENT DOCUMENTS

| WO | WO2007/061587 | 5/2007 | |
|---|---|---|---|
| WO | WO2011/085371 | 7/2011 | |
| WO | WO2013/009511 | 1/2013 | |
| WO | WO 2013009511 A1 * | 1/2013 | ............... C08J 5/18 |

OTHER PUBLICATIONS

PCT Search Report dated Jun. 18, 2014; from PCT counterpart Application No. PCT/US2014/025304.
PCT IPRP dated Sep. 29, 2015; from PCT counterpart Application No. PCT/US2014/025304.
EP Office Action dated Nov. 4, 2015; from EP counterpart Application No. 14719939.2.
EP Response to Office Action dated May 11, 2016; from EP counterpart Application No. 14719939.2.
Chinese Response to Office Action received Feb. 16, 2017; from Chinese counterpart Application No. 201480014296.0.

* cited by examiner

ETHYLENE/ALPHA-OLEFIN INTERPOLYMER COMPOSITION

REFERENCE TO RELATED APPLICATIONS

The present application claims the benefit of U.S. Provisional Application No. 61/806,103, filed on Mar. 28, 2013.

FIELD OF INVENTION

The instant invention relates to an ethylene/alpha-olefin interpolymer composition suitable for blown film applications, and blown films made therefrom.

BACKGROUND OF THE INVENTION

The use of polymeric materials such as polyethylene to form films suitable for packaging applications are generally known. Such films may be single layer or multiple layer films formed via any conventional film process, for example a blown film process.

However, there is a need for a polyethylene composition that provides improved processability and optical properties while maintaining acceptable levels of oxygen transmission rate as well as moisture vapor transmission rate.

SUMMARY OF THE INVENTION

The instant invention provides an ethylene/alpha-olefin interpolymer composition suitable for blown film applications, and blown films made therefrom.

In one embodiment, the instant invention provides a ethylene/alpha-olefin interpolymer composition suitable for blown film applications comprising greater than 80 percent by weight of units derived from ethylene and 20 percent or less by weight of units derived from one or more alpha olefin co-monomers, wherein said ethylene/alpha-olefin interpolymer has a density in the range of from 0.910 to 0.918 g/cm$^3$, a melt index $I_2$ in the range of from 0.5 to 1.1 g/10 minutes, a melt flow ratio $I_{10}/I_2$ in the range of from 8 to 10, a melt strength in the range of from 3 to 6 cN, a highest temperature fraction in the range of from 11 to 14 percent determined by CEF, a highest peak temperature fraction by CEF in the range of from 96 to 100° C., and a lowest temperature fraction from CEF in the range of from 2 to 5 percent, and a DSC heat curve having three melting peaks with a highest temperature melting peak in the range of from 120 to 124° C., and a crystallinity in the range of from 40 to 50 percent.

In another alternative embodiment, the instant invention further provides a blown film comprising the inventive ethylene/alpha-olefin interpolymer composition.

In an alternative embodiment, the instant invention provides a blown film, in accordance with any of the preceding embodiments, except that the blown film is characterized by having a Total Haze in the range of less than 20, for example less than 15; wherein said film has a 1 mil thickness, and said polyolefin composition may further comprises one or more antiblock agents and/or one or more slip agents, and wherein said film is produced via a blown film process which has at least 10 percent production rate increase over another ethylene based polymer having one or more properties outside of the required property ranges of the ethylene/alpha-olefin interpolymer composition.

In an alternative embodiment, the instant invention provides a blown film, in accordance with any of the preceding embodiments, except that the ethylene based polymer has a melt index outside of the required melt index range of the ethylene/alpha-olefin interpolymer composition.

BRIEF DESCRIPTION OF THE DRAWINGS

For the purpose of illustrating the invention, there is shown in the drawings a form that is exemplary; it being understood, however, that this invention is not limited to the precise arrangements and illustrations shown.

DETAILED DESCRIPTION OF THE INVENTION

Figure 1:
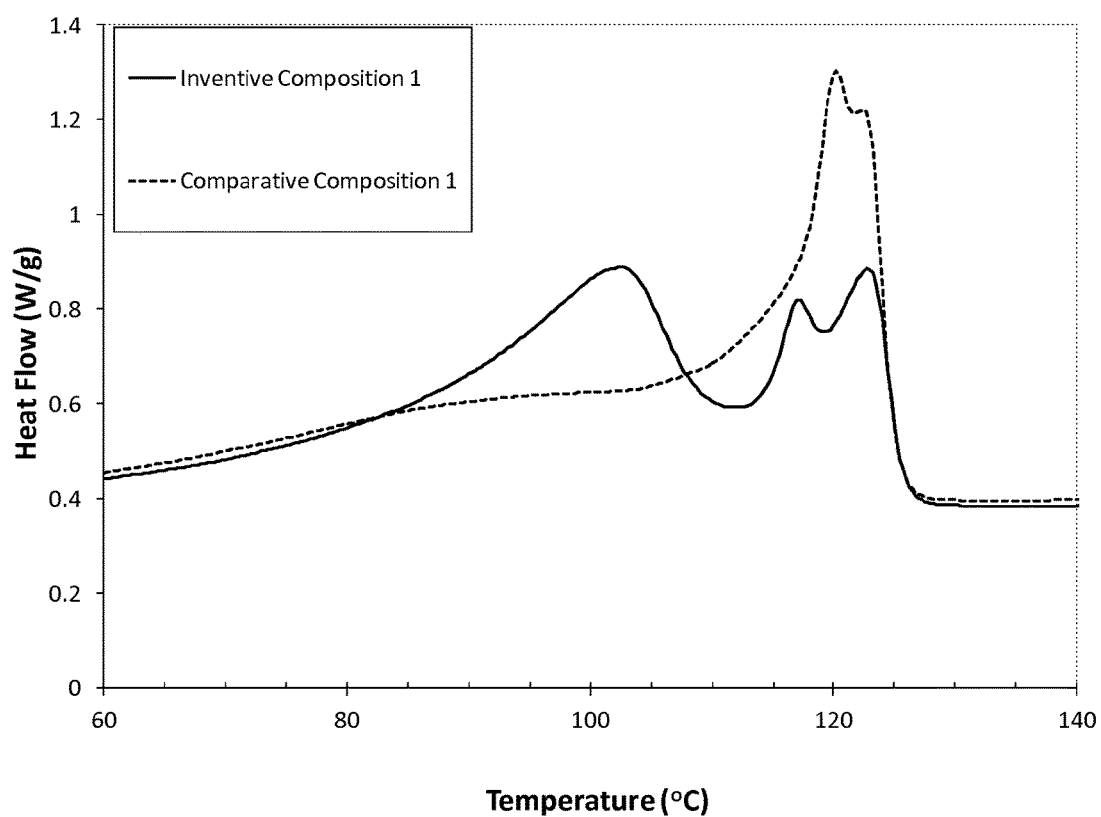
FIG. 1 is a graph illustrating the heating curve by DSC (heat flow in W/g vs. temperature in ° C.) of Comparative Composition 1 and Inventive Composition 1.
Figure 2:
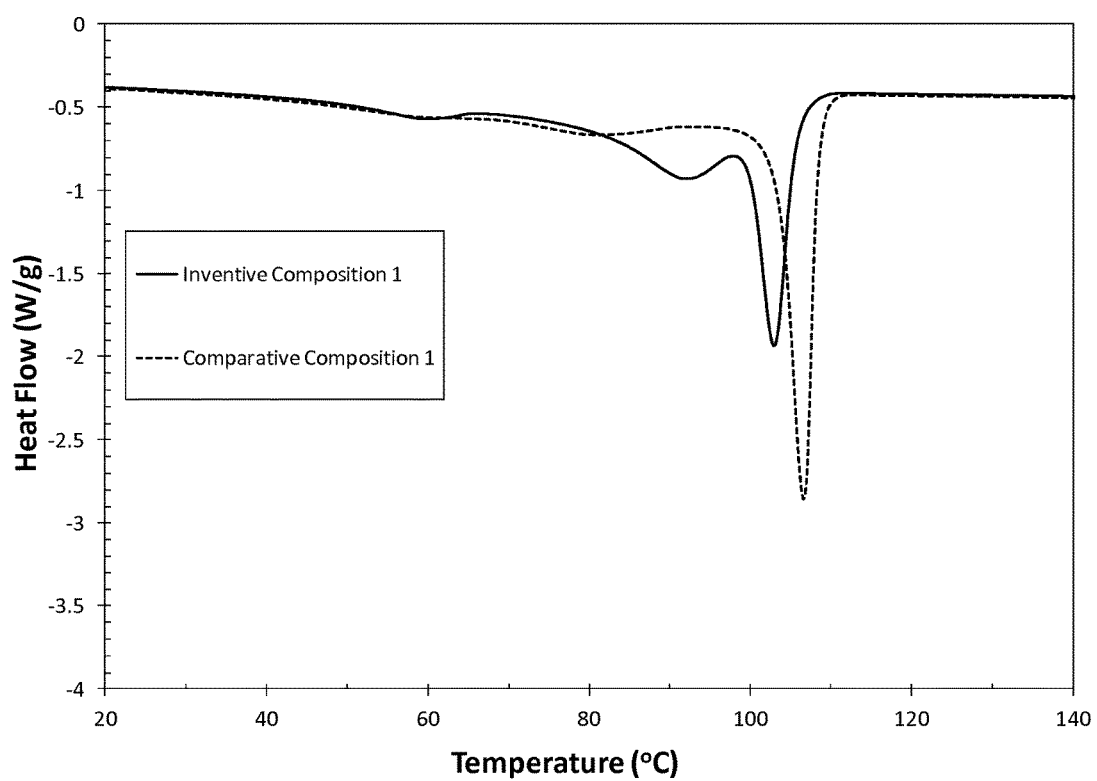
FIG. 2 is a graph illustrating the cooling curve by DSC (heat flow in W/g vs. temperature in ° C.) of Comparative Composition 1 and Inventive Composition 1.
Figure 3:
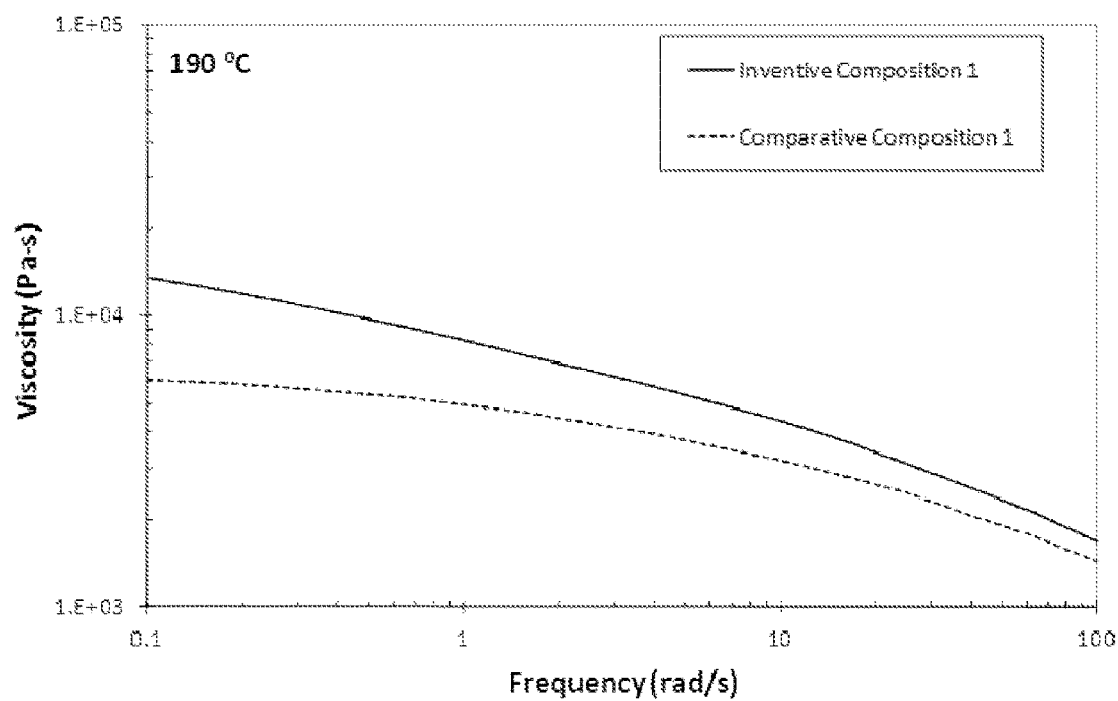
FIG. 3 is a graph illustrating the dynamic mechanical spectroscopy viscosity data at 190° C. (complex viscosity in Pa-s vs. frequency in rad/s) of Comparative Composition 1 and Inventive Composition 1.
Figure 4:
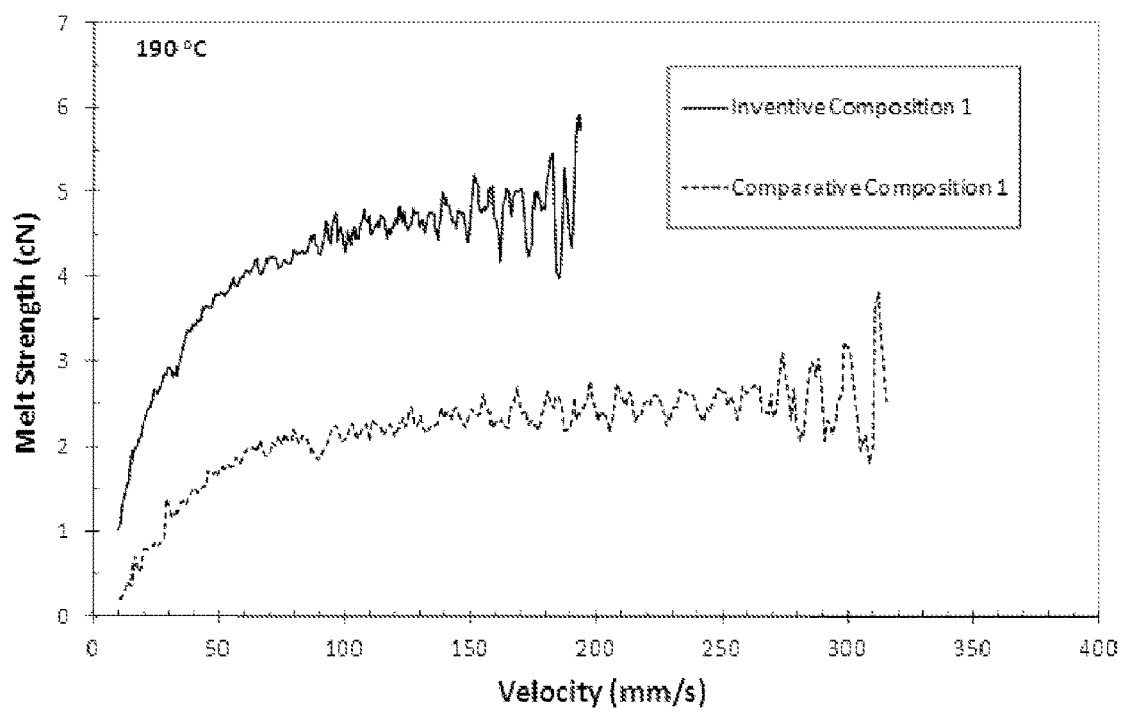
FIG. 4 is a graph illustrating the melt strength at 190° C. (melt strength in cN vs. velocity in mm/s) of Comparative Composition 1 and Inventive Composition 1.
Figure 5:
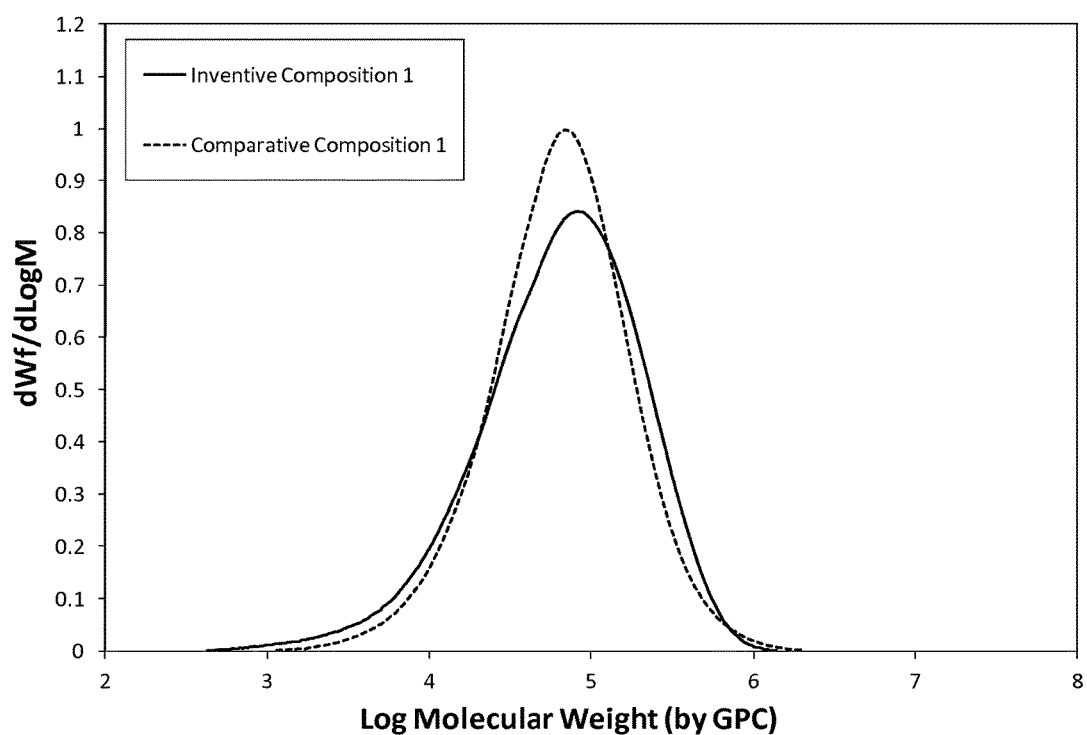
FIG. 5 is a graph illustrating the gel permeation chromatography curves (dWf/d Log M vs. Log Molecular Weight by GPC) of Comparative Composition 1 and Inventive Composition 1.
Figure 6:
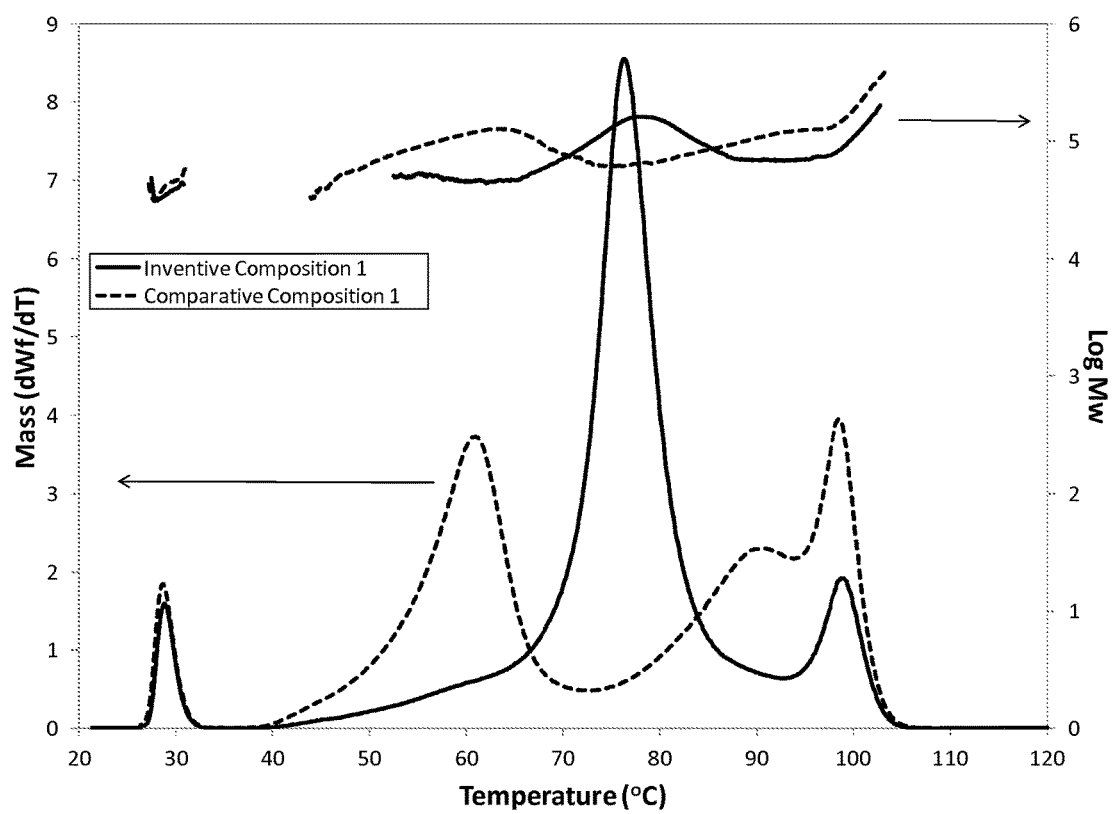
FIG. 6 is a graph illustrating the crystallization elution fractionation data (Mass or dWf/dT and Log Mw where Mw is in g/mol vs. temperature in ° C.) of Comparative Composition 1 and Inventive Composition 1.

The instant invention provides an ethylene/alpha-olefin interpolymer composition suitable for blown film applications, and blown films made therefrom. The ethylene/alpha-olefin interpolymer composition suitable for blown film applications comprises greater than 80 percent by weight of units derived from ethylene and 20 percent or less by weight of units derived from one or more alpha olefin co-monomers, wherein the ethylene/alpha-olefin interpolymer composition has a density in the range of from 0.910 to 0.918 g/cm$^3$, a melt index $I_2$ in the range of from 0.5 to 1.1 g/10 minutes, a melt flow ratio $I_{10}/I_2$ in the range of from 8 to 10, a melt strength in the range of from 3 to 6 cN, a highest temperature fraction in the range of from 11 to 14 percent determined by CEF, a highest peak temperature fraction by CEF in the range of from 96 to 100° C., and a lowest temperature fraction from CEF in the range of from 2 to 5 percent, and a DSC heat curve having three melting peaks with a highest temperature melting peak in the range of from 120 to 124° C., and a crystallinity in the range of from 40 to 50 percent.

Ethylene/α-Olefin Interpolymer Composition

The ethylene/α-olefin interpolymer composition comprises (a) less than or equal to 100 percent, for example, at least 80 percent, or at least 90 percent, of the units derived from ethylene; and (b) less than 20 percent, for example, less than 15 percent, or less than 10 percent, by weight of units derived from one or more α-olefin comonomers. The term "ethylene/α-olefin interpolymer composition" refers to a polymer that contains more than 50 mole percent polymerized ethylene monomer (based on the total amount of polymerizable monomers) and, optionally, may contain at least one comonomer.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The ethylene/α-olefin interpolymer composition has a density in the range of 0.910 to 0.918 g/cm$^3$, for example from 0.910 to 0.917 g/cm$^3$. For example, the density can be from a lower limit of 0.910, 0.911, or 0.912 g/cm$^3$ to an upper limit of 0.916, 0.917, or 0.918 g/cm$^3$.

The ethylene/α-olefin interpolymer composition has a molecular weight distribution ($M_w/M_n$) in the range of from 3.0 to 5.0. For example, the molecular weight distribution ($M_w/M_n$) can be from a lower limit of 3.0, 3.1, or 3.2 to an upper limit of 4.0, 4.5, or 5.0.

The ethylene/α-olefin interpolymer composition has a melt index ($I_2$ at 190° C./2.16 kg) in the range of from 0.1 to 2.0 g/10 minutes, for example from 0.5 to 1.5 g/10 minutes, or 0.5 to 1.1 g/10 minutes. For example, the melt index ($I_2$ at 190° C./2.16 kg) can be from a lower limit of 0.1, 0.5, 0.6, or 0.7 g/10 minutes to an upper limit of 1.1, 1.6, 1.7, 1.8, 1.9, or 2.0 g/10 minutes.

The ethylene/α-olefin interpolymer composition has melt flow ratio $I_{10}/I_2$ in the range of from 8 to 10, for example, from 8 to 9.5, or in the alternative from 8.2 to 9.4.

The ethylene/α-olefin interpolymer composition has a melt strength in the range of from 2 to 8 cN, for example, from 3 to 6 cN, from 4 to 5 cN.

The ethylene/α-olefin interpolymer composition has a highest temperature fraction in the range of from 6 to 15 percent determined by CEF, for example, for example 10 to 15, or in the alternative from 11 to 14, or in the alternative, from 8.4 to 13.3.

The ethylene/α-olefin interpolymer composition has a highest peak temperature fraction by CEF in range of from 95 to 105° C., for example from 96 to 100° C.

The ethylene/α-olefin interpolymer composition has a lowest temperature fraction from CEF in the range of from 1 to 5 percent; for example, from 2 to 5, or in the alternative, from 2 to 4.

The ethylene/α-olefin interpolymer composition has a DSC heat curve having three melting peaks with a highest temperature melting peak in the range of from 120 to 124° C., for example, from 121 to 123° C.

The ethylene/α-olefin interpolymer composition has a crystallinity in the range of from 40 to 50 percent; for example, from 42 to 47, or in the alternative from 43 to 46.

The ethylene/α-olefin interpolymer composition may further comprise additional components such as one or more additives. Such additives include, but are not limited to, antistatic agents, color enhancers, dyes, lubricants, fillers such as $TiO_2$ or $CaCO_3$, opacifiers, nucleators, processing aids, pigments, primary anti-oxidants, secondary anti-oxidants, processing aids, UV stabilizers, anti-blocks, slip agents, tackifiers, fire retardants, anti-microbial agents, odor reducer agents, anti-fungal agents, and combinations thereof. The ethylene-based polymer composition may contain from about 0.05 to about 10 percent by the combined weight of such additives, based on the weight of the ethylene-based polymer composition including such additives.

The ethylene/α-olefin interpolymer composition may further be blended with one or more polymeric materials, e.g. a low density polyethylene (LDPE) or another linear low density polyethylene (LLDPE). Such LLDPEs are commercially available under the tradename DOWLEX, ELITE, ELITE AT, and ATTANE from The Dow Chemical Company. Such LLDPEs typically have a density in the range of 0.900 to 0.950 g/cm$^3$, and a melt index $I_2$ in the range of from 0.5 to 10 g/10 minutes.

The low density polyethylene (LDPE) is produced at high pressure by free-radical polymerization. For a high pressure, free radical initiated polymerization process, two basic types of reactors are known. The first type is an agitated autoclave vessel having one or more reaction zones (the autoclave reactor). The second type is a jacketed tube which has one or more reaction zones (the tubular reactor).

The pressure in each autoclave and tubular reactor zone of the process is from 100 MPa to 400 MPa; for example, from 120 MPa to 360 MPa, or in the alternative, from 150 MPa to 320 MPa.

The polymerization temperature in each tubular reactor zone of the process is from 100° C. to 400° C.; for example, from 130° C. to 360° C., or in the alternative, from 140° C. to 330° C.

The polymerization temperature in each autoclave reactor zone of the process is from 150° C. to 300° C.; for example, from 165° C. to 290° C., or in the alternative from 180° C. to 280° C.

Any conventional polymerization processes may be employed to produce the ethylene/α-olefin interpolymer composition. Such conventional polymerization processes include, but are not limited to, solution polymerization process, using one or more conventional reactors e.g. loop reactors, isothermal reactors, stirred tank reactors, batch reactors in parallel, series, and/or any combinations thereof.

The ethylene/α-olefin interpolymer composition may, for example, be produced via solution phase polymerization process using one or more loop reactors, isothermal reactors, and combinations thereof.

In general, the solution phase polymerization process occurs in one or more well-stirred reactors such as one or more loop reactors or one or more spherical isothermal reactors at a temperature in the range of from 115 to 250° C.; for example, from 115 to 200° C., and at pressures in the range of from 300 to 1000 psi; for example, from 400 to 750 psi. In one embodiment in a dual reactor, the temperature in the first reactor temperature is in the range of from 115 to 190° C., for example, from 115 to 150° C., and the second reactor temperature is in the range of 150 to 200° C., for example, from 170 to 195° C. In another embodiment in a single reactor, the temperature in the reactor temperature is in the range of from 115 to 190° C., for example, from 115 to 150° C. The residence time in a solution phase polymerization process is typically in the range of from 2 to 30 minutes; for example, from 10 to 20 minutes. Ethylene, solvent, one or more catalyst systems, optionally one or more cocatalysts, and optionally one or more comonomers are fed continuously to one or more reactors. Exemplary solvents include, but are not limited to, isoparaffins. For example, such solvents are commercially available under the name ISOPAR E from ExxonMobil Chemical Co., Houston, Tex. The resultant mixture of the ethylene/alpha-olefin interpolymer composition and solvent is then removed from the reactor and the ethylene/alpha-olefin interpolymer composition is isolated. Solvent is typically recovered via a solvent recovery unit, i.e. heat exchangers and vapor liquid separator drum, and is then recycled back into the polymerization system.

In one embodiment, the ethylene/α-olefin interpolymer composition may be produced via a solution polymerization process in a dual reactor system, for example a dual loop reactor system, wherein ethylene and optionally one or more α-olefins are polymerized in the presence of one or more catalyst systems. Additionally, one or more cocatalysts may be present.

In another embodiment, the ethylene/alpha-olefin interpolymer composition may be produced via a solution polymerization process in a single reactor system, for example a single loop reactor system, wherein ethylene and optionally one or more α-olefins are polymerized in the presence of one or more catalyst systems. Additionally, one or more cocatalysts may be present.

Enduse Applications

The ethylene/alpha-olefin interpolymer composition according to the present invention can be formed into a film and used in various packaging applications, e.g. food packaging applications. The inventive ethylene/alpha-olefin interpolymer composition may be formed into a film via, for example, a blown film process. In one embodiment, the ethylene/alpha-olefin interpolymer composition is formed into a single layer film via a blown film process. In another embodiment, ethylene/alpha-olefin interpolymer composition may be formed into a multi-layer blown film structure. In another embodiment, the ethylene/alpha-olefin interpolymer composition may be formed into a single layer or a multi-layer blown film structure associated with one or more substrates. The blown films prepared according to the present invention may be used in various packaging applications, e.g. food packaging applications such as fresh cut produce, and snacks. The blown films according to the present invention have a thickness in the range of from 1.25 mils to 4 mils. The blown films according to the present invention have an oxygen transmission rate in the range of from 600 to 800, for example from 650 to 750, e.g. approximately 700, cc-mil/100 sq.in-day-atm, measured at 23° C. and 0% relative humidity. The blown films according to the present invention have a moisture vapor transmission rate in the range of 1.1 to 1.4, e.g. approximately 1.2, gm-mil/100 sq.in-day @ 38 C, 100% RH.

EXAMPLES

The following examples illustrate the present invention but are not intended to limit the scope of the invention. The examples of the instant invention demonstrate that the ethylene/alpha-olefin interpolymer composition of the present invention provide improved processability and optical properties while maintaining acceptable levels of oxygen transmission rate as well as vapor transmission rate.

Comparative Example 1

Comparative Example 1 is a an ethylene-octene copolymer having a density of 0.9155 g/cm$^3$ and a melt index $I_2$ of 1.47 g/10 minutes, which is commercially available under the tradename ELITE™ 5500G from The Dow Chemical Company.

Production of Inventive Example 1

Inventive Composition 1 is prepared according to the following process according to the conditions reported in Tables 1-4.

All raw materials (ethylene, 1-octene) and the process solvent (a narrow boiling range high-purity isoparaffinic solvent, commercially available under the tradename Isopar E from Exxon Mobil Corporation) are purified with molecular sieves before introduction into the reaction environment. High purity hydrogen is supplied by a shared pipeline; it is mechanically pressurized to above reaction pressure at 500 psig prior to delivery to the reactors; any potential residual moisture is removed via molecular sieve 4 A. The reactor monomer feed (ethylene) streams are pressurized via mechanical compressor to above reaction pressure at 500 psig. The solvent feeds are mechanically pressurized to above reaction pressure at 500 psig. The comonomer (1-octene) feed is also mechanically pressurized to above reaction pressure at 500 psig and is injected directly into the combined feed stream for the second reactor. Three catalyst components are injected into the first reactor (CAT-B, RIBS-2, and MMAO-3A, defined in Table 1). The RIBS-2 catalyst component is diluted to an optimum concentration. The CAT-B and MMAO-3A catalyst components are further batch-wise diluted to an optimum concentration with purified solvent (Isopar E) prior to injection into the reactor. Two catalyst components are injected into the second reactor (Ziegler-Natta premix, and triethylaluminum (TEA)). All catalyst components are independently mechanically pressurized to above reaction pressure at 500 psig. All reactor catalyst feed flows are measured with mass flow meters and independently controlled with positive displacement metering pumps.

The continuous solution polymerization reactors consist of two liquid full, non-adiabatic, isothermal, circulating, and independently controlled loops operating in a series configuration. Each reactor has independent control of all fresh solvent, monomer, comonomer, hydrogen, and catalyst component feeds. The combined solvent, monomer, comonomer and hydrogen feed to each reactor is independently temperature controlled to anywhere between 10° C. to 50° C. and typically 15° C. by passing the feed stream through a series of heat exchangers. The fresh comonomer feed to the polymerization reactors can be aligned to add comonomer to one of three choices: the first reactor, the second reactor, or the common solvent where it is then split between both reactors proportionate to the shared solvent feed split. In this example the comonomer is fed to the second reactor. The total fresh feed to each polymerization reactor is injected into the reactor at two locations per reactor roughly with equal reactor volumes between each injection location. The fresh feed to the first reactor is controlled typically with each injector receiving half of the total fresh feed mass flow. The fresh feed to the second reactor in series is controlled typically to maintain half of the total ethylene mass flow near each injector, and since the non-reacted ethylene from the first reactor enters the second reactor adjacent to the lower pressure fresh feed this injector usually has less than half of the total fresh feed mass flow to the second reactor. The catalyst components for the first reactor are injected into the polymerization reactor through specially designed injection stingers and are each separately injected into the same relative location in the first reactor with no contact time prior to the reactor. The catalyst components for the second reactor (Ziegler-Natta premix and TEA) are injected into the second polymerization reactor through specially designed injection stingers and are each injected into the same relative location in the second reactor.

The primary catalyst component feed for each reactor (CAT-B for the first reactor and a Ziegler-Natta premix for the second reactor) is computer controlled to maintain the individual reactor monomer concentration at a specified target. The cocatalyst components (RIBS-2 and MMAO-3A for the first reactor and TEA for the second reactor) are fed based on calculated specified molar ratios to the primary catalyst component Immediately following each fresh injection location (either feed or catalyst), the feed streams are mixed with the circulating polymerization reactor contents with Kenics static mixing elements. The contents of each reactor are continuously circulated through heat exchangers responsible for removing much of the heat of reaction and with the temperature of the coolant side responsible for maintaining an isothermal reaction environment at the specified reactor temperature. Circulation around each reactor loop is provided by a screw pump. The effluent from the first polymerization reactor (containing solvent, monomer, comonomer, hydrogen, catalyst components, and dissolved polymer) exits the first reactor loop and passes through a control valve (responsible for controlling the pressure of the first reactor at a specified target) and is injected into the second polymerization reactor of similar design. After the stream exits the second reactor it is contacted with water to stop the reaction. The stream then goes through another set of Kenics static mixing elements to evenly disperse the water catalyst kill and any additives.

Following additive addition, the effluent (containing solvent, monomer, comonomer, hydrogen, catalyst components, and dissolved polymer) passes through a heat exchanger to raise the stream temperature in preparation for separation of the polymer from the other lower boiling reaction components. The stream then enters a two stage separation and devolatization system where the polymer is removed from the solvent, hydrogen, and non-reacted monomer and comonomer. The recycled stream is purified before entering the reactor again. The separated and devolatized polymer melt is then combined with a small side stream of additional additives contained within a polymer melt injected into the process by a single screw extruder. These additives are mixed with the main process polymer melt by another series of Kenics static mixing element. The fully additive loaded polymer stream then enters a die specially designed for underwater pelletization, is cut into uniform solid pellets, dried, and transferred into a hopper.

The non-polymer portions removed in the devolatilization step pass through various pieces of equipment which separate most of the monomer which is removed from the system, cooled, mechanically compressed, and sent via pipeline back to a light hydrocarbons processing plant for reuse. Most of the solvent and comonomer are recycled back to the reactor after passing through purification beds. This solvent can still have non-reacted co-monomer in it that is fortified with fresh co-monomer prior to re-entry to the reactor as previously discussed. This fortification of the co-monomer is an essential part of the product density control method. This recycle solvent can contain some dissolved hydrogen which is then fortified with fresh hydrogen to achieve the polymer molecular weight target. A very small amount of solvent temporarily leaves the system where it is purified and reused or purged from the system as a co-product.

TABLE 1

| Description | Chemical Name |
| --- | --- |
| CAT-B | Titanium, [N-(1,1-dimethylethyl)-1,1-dimethyl-1-[(1,2,3,3a,8a-η)-1,5,6,7-tetrahydro-2-methyl-s-indacen-1-yl]silanaminato(2-)-κN][(1,2,3,4-η)-1,3-pentadiene]- |
| RIBS-2 | bis(hydrogenated tallow alkyl)methyl, tetrakis(pentafluorophenyl)borate(1-) amine |
| MMAO-3A | Aluminoxanes, iso-Bu Me, branched, cyclic and linear; modified methyl aluminoxane |

TABLE 2

|  |  | Inventive Composition 1 |
| --- | --- | --- |
| Ethylene Feed Split | % | 75.60 |
| Fresh Comonomer Injection Location | # | Second Reactor |
| Fresh Comonomer Flow | klb/hr | 6.32 |
| Comonomer to Polymer Ratio | — | 12.6 |
| Primary Reactor Fresh Ethylene Flow | klb/hr | 33.9 |
| Primary Reactor Solvent to Ethylene Ratio | — | 4.80 |
| Primary Reactor Total Solvent Flow | klb/hr | 167.4 |
| Primary Reactor Fresh Hydrogen Flow | lb/hr | 1.00 |
| Primary Reactor Hydrogen Mole % | mol % | 0.041 |
| Primary Reactor Feed Temperature | ° C. | 17.1 |
| Secondary Reactor Fresh Ethylene Flow | klb/hr | 11.1 |
| Secondary Reactor Solvent to Ethylene Ratio | — | 3.69 |
| Secondary Reactor Total Solvent Flow | klb/hr | 39.7 |
| Secondary Reactor Fresh Hydrogen Flow | lb/hr | 3.8 |
| Secondary Reactor Hydrogen Mole % | mol % | 0.49 |
| Secondary Reactor Feed Temperature | ° C. | 15.1 |
| Secondary Reactor Bed Bypass Flow | klb/hr | 0.63 |
| Recycle Solvent Ethylene Concentration | wt % | 0.5 |
| Recycle Solvent Comonomer Concentration | wt % | 8.0 |

TABLE 3

|  |  | Inventive Composition 1 |
| --- | --- | --- |
| Primary Reactor Ethylene Concentration | g/L | 28.8 |
| Primary Reactor Temperature | ° C. | 145.1 |
| Primary Reactor log Viscosity | LogcP | 3.00 |
| Primary Reactor Residence Time | min | 9.3 |
| Primary Reactor Polymer Concentration | wt % | 14.7 |
| Primary Reactor Ethylene Conversion | wt % | 72.6 |
| Secondary Reactor Ethylene Concentration | g/L | 6.5 |
| Secondary Reactor Temperature | ° C. | 188.0 |
| Secondary Reactor log Viscosity | log (cP) | 2.89 |
| Secondary Reactor Residence Time | min | 7.4 |
| Secondary Reactor Polymer Concentration | wt % | 19.4 |
| Overall Ethylene Conversion | % | 94.2 |
| Ethylene Vent Mass Flow | lb/hr | 839 |

TABLE 4

|  |  | Inventive Composition 1 |
| --- | --- | --- |
| Primary Reactor Primary Catalyst Type | — | CAT-B |
| Primary Reactor Co-Catalyst-1 Type | — | RIBS-2 |
| Primary Reactor Co-Catalyst-1 Molar Ratio | — | 1.2 |
| Primary Reactor Co-Catalyst-2 Type | — | MMAO-3A |
| Primary Reactor Co-Catalyst-2 Molar Ratio | — | 0.7 |
| Primary Reactor Co-Catalyst-1 Efficiency | Mlbs poly/lb RIBS | 0.07 |
| Secondary Reactor Primary Catalyst Type | — | Ziegler-Natta |

TABLE 4-continued

|  |  | Inventive Composition 1 |
|---|---|---|
| Secondary Reactor Co-Catalyst Type | — | TEA |
| Secondary Reactor Co-Catalyst Molar Ratio | lb/lb | 6.5 |

Characterization of Comparative Examples and Inventive Examples

Inventive Composition 1 and Comparative Composition 1 were tested for their properties, and the results are reported in Tables 5-12. Table 5 contains the melt index and density data. Table 6 summarizes the differential scanning calorimetry (DSC) data. Tables 7 and 8 summarize the dynamic mechanical spectroscopy (DMS) data measured at 190° C. Table 9 contains the melt strength data measured at 190° C. Table 10 summarizes the gel permeation chromatography data. Table 11 summarizes the crystallization elution fractionation (CEF) data.

TABLE 5

| Sample | Melt Index $I_2$ at 190° C. (g/10 min) | $I_{10}/I_2$ | Density (g/cm³) |
|---|---|---|---|
| Inventive Composition 1 | 0.81 | 8.75 | 0.9153 |
| Comparative Composition 1 | 1.47 | 7.59 | 0.9155 |

TABLE 6

|  | $T_{m1}$ (° C.) | $T_{m2}$ (° C.) | $T_{m3}$ (° C.) | Heat of Fusion (J/g) | % Cryst. | $T_{c1}$ (° C.) | $T_{c2}$ (° C.) | $T_{c3}$ (° C.) |
|---|---|---|---|---|---|---|---|---|
| Inventive Composition 1 | 122.8 | 117.2 | 102.4 | 136.5 | 46.7 | 102.8 | 91.9 | 59.6 |
| Comparative Composition 1 | 122.5 | 120.2 | — | 135 | 46.2 | 106.5 | 80.7 | — |

TABLE 7

| Frequency (rad/s) | Viscosity (Pa-s) Inventive Composition 1 | Viscosity (Pa-s) Comparative Composition 1 | Tan Delta Inventive Composition 1 | Tan Delta Comparative Composition 1 |
|---|---|---|---|---|
| 0.10 | 13,536 | 6,052 | 3.68 | 12.10 |
| 0.16 | 12,569 | 5,914 | 3.24 | 9.57 |
| 0.25 | 11,420 | 5,739 | 2.92 | 7.66 |
| 0.40 | 10,277 | 5,520 | 2.70 | 6.28 |
| 0.63 | 9,205 | 5,259 | 2.54 | 5.24 |
| 1.00 | 8,210 | 4,963 | 2.41 | 4.45 |
| 1.58 | 7,307 | 4,638 | 2.29 | 3.83 |
| 2.51 | 6,478 | 4,291 | 2.17 | 3.34 |
| 3.98 | 5,741 | 3,928 | 2.04 | 2.94 |
| 6.31 | 5,031 | 3,570 | 1.89 | 2.59 |
| 10.00 | 4,372 | 3,196 | 1.73 | 2.29 |
| 15.85 | 3,747 | 2,826 | 1.57 | 2.03 |
| 25.12 | 3,114 | 2,461 | 1.41 | 1.79 |
| 39.81 | 2,586 | 2,075 | 1.27 | 1.59 |
| 63.10 | 2,108 | 1,747 | 1.14 | 1.40 |
| 100.00 | 1,685 | 1,440 | 1.01 | 1.24 |
| [Viscosity (0.1 rad/s)]/[Viscosity (100 rad/s)] | 8.03 | 4.20 | | |

TABLE 8

| Frequency (rad/s) | G* (Pa) Inventive Composition 1 | Phase Angle Inventive Composition 1 | G* (Pa) Comparative Composition 1 | Phase Angle Comparative Composition 1 |
|---|---|---|---|---|
| 0.10 | 1,354 | 74.80 | 605 | 85.27 |
| 0.16 | 1,992 | 72.83 | 937 | 84.04 |
| 0.25 | 2,869 | 71.10 | 1,442 | 82.56 |
| 0.40 | 4,091 | 69.65 | 2,198 | 80.96 |
| 0.63 | 5,808 | 68.48 | 3,318 | 79.20 |
| 1.00 | 8,210 | 67.45 | 4,963 | 77.34 |
| 1.58 | 11,581 | 66.43 | 7,350 | 75.39 |
| 2.51 | 16,273 | 65.26 | 10,778 | 73.33 |
| 3.98 | 22,856 | 63.86 | 15,637 | 71.20 |
| 6.31 | 31,744 | 62.10 | 22,528 | 68.90 |
| 10.00 | 43,718 | 59.97 | 31,959 | 66.43 |
| 15.85 | 59,385 | 57.50 | 44,794 | 63.75 |
| 25.12 | 78,215 | 54.73 | 61,827 | 60.87 |
| 39.81 | 103,000 | 51.74 | 82,610 | 57.77 |
| 63.10 | 133,000 | 48.62 | 110,000 | 54.51 |
| 100.00 | 168,000 | 45.40 | 144,000 | 51.08 |

TABLE 9

|  | Melt Strength (cN) at 190° C. |
|---|---|
| Inventive Composition 1 | 4.7 |
| Comparative Composition 1 | 2.6 |

TABLE 10

|  | $M_w$ (g/mol) | $M_n$ (g/mol) | $M_w/M_n$ | $M_z$ (g/mol) |
|---|---|---|---|---|
| Inventive Composition 1 | 108,351 | 27,843 | 3.89 | 236,634 |
| Comparative Composition 1 | 101,796 | 37,140 | 2.74 | 249,380 |

TABLE 11

| Description | Temp Range of Each Zone (° C.) Zone 1 | Zone 2 | Zone 3 | Peak Temp of Each Zone (° C.) Zone 1 | Zone 2 | Zone 3 |
|---|---|---|---|---|---|---|
| Inventive Composition 1 | 26.32 to 31.96 | 32.01 to 92.61 | 92.68 to 109.94 | 28.76 | 76.34 | 98.91 |
| Comparative Composition 1 | 26.33 to 31.97 | 32.01 to 86 | 86.1 to 109.99 | 28.66 | 60.97 | 98.55 |

TABLE 12

| Description | Wt % of Each zone | | | Mw of Each Zone (g/mol) | | |
|---|---|---|---|---|---|---|
| | Zone 1 | Zone 2 | Zone 3 | Zone 1 | Zone 2 | Zone 3 |
| Inventive Composition 1 | 0.04 | 0.85 | 0.11 | | 116,104 | 95,670 |
| Comparative Composition 1 | 0.04 | 0.56 | 0.40 | 41,691 | 94,753 | 136,202 |

Production of Blown Films

Inventive Composition 1 and Comparative Composition 1 were formed into Inventive Film 1 and Comparative Film 1, respectively, according to the following process. The monolayer blown films were made on an "8 inch die" with a polyethylene "Davis Standard Barrier II screw." External cooling by an air ring and internal bubble cooling were used. General blown film parameters used to produce each blown film are reported in Table 13. The temperatures are the temperatures closest to the pellet hopper (Barrel 1), and in increasing order, as the polymer was extruded through the die.

TABLE 13

| Blow up ratio (BUR) | 2.5 |
|---|---|
| Film thickness | 1 |
| Die gap (mil) | 70 |
| Temperature profile (° F.) | |
| Barrel 1 | 350 |
| Barrel 2 | 415 |
| Barrel 3 | 365 |
| Barrel 4 | 305 |
| Barrel 5 | 305 |
| Screen Temperature | 410 |
| Adapter | 410 |
| Block | 430 |
| Lower Die | 440 |
| Inner Die | 440 |
| Upper Die | 440 |

Production of Films for Determination of Maximum Output Rate of Blown Film

Inventive Composition 1 and Comparative Composition 1 were formed into Inventive Film 1 and Comparative Film 1, respectively, according to the following process. Samples were made at a controlled rate and at a maximum rate. The controlled rate was 250 lb/hr, which equals an output rate of 10.0 lb/hr/inch of die circumference. The die diameter used for the maximum output trials was an 8 inch die, so that for the controlled rate, as an example, the conversion between "lb/hr" and "lb/hr/inch" of die circumference, is shown in the equation below. Similarly, such an equation can be used for other rates, such as the maximum rate, by substituting the maximum rate in the equation below to determine the "lb/hr/inch" of die circumference.

Lb/Hr/Inch of Die Circumference=(250 Lb/Hr)/(8*π)=10

The maximum rate for a given sample was determined by increasing the output rate to the point where bubble stability was the limiting factor. The extruder profile was maintained for both samples (standard rate and maximum rate), however the melt temperature was higher for the maximum rate samples, due to the increased shear rate with higher motor speed (rpm, revolutions per minute). The maximum bubble stability was determined by taking the bubble to the point where it would not stay seated in the air ring. At that point, the rate was reduced to where the bubble was reseated in the air ring, and then a sample was collected. The cooling on the bubble was adjusted by adjusting the air ring and maintaining the bubble. This was taken as the maximum output rate while maintaining bubble stability.

Properties of Inventive Film 1 were measured and are listed in Table 14. Maximum blown film rates achieved are listed in Table 15.

TABLE 14

| | Inventive Film 1 |
|---|---|
| Haze (%) | 14 |
| Haze, Internal (%) | 1.75 |
| 45° Gloss (%) | 40 |
| Clarity (%) | 98 |
| MD Elmendorf Tear (g) | 251 |
| CD Elmendorf Tear (g) | 519 |
| MD Normalized Elmendorf Tear (g/mil) | 234 |
| CD Normalized Elmendorf Tear (g/mil) | 506 |
| Dart B (g) | 472 |
| 2% MD Secant Modulus (psi) | 18,833 |
| 2% CD Secant Modulus (psi) | 19,611 |
| MD Peak Load (lbf) | 5.4 |
| CD Peak Load (lbf) | 6.8 |
| MD Stress at Yield (Psi) | 1,120 |
| CD Stress at Yield (Psi) | 1,180 |
| MD Strain at Break (%) | 416 |
| CD Strain at Break (%) | 646 |
| MD Break Stress (psi) | 4,864 |
| CD Break Stress (psi) | 6,048 |

TABLE 15

| | Inventive Film 1 | Comparative Film 1 |
|---|---|---|
| Blown film rate increase in % increase over comparative | 19% | n/a |
| Specific run rate, pph per inch of die circumference | 15.4 | 12.9 |

Test Methods

Test methods include the following:

Density

Samples for density measurements were prepared according to ASTM D 4703-10. Samples were pressed at 374° F. (190° C.), for five minutes, at 10,000 psi (68 MPa). The temperature was maintained at 374° F. (190° C.) for the above five minutes, and then the pressure was increased to 30,000 psi (207 MPa) for three minutes. This was followed by a one minute hold at 70° F. (21° C.) and 30,000 psi (207 MPa). Measurements were made within one hour of sample pressing using ASTM D792-08, Method B.

Melt Index

Melt index ($I_2$), was measured in accordance with ASTM D 1238-10, Condition 190° C./2.16 kg, Method A, and was reported in grams eluted per 10 minutes.

Melt index ($I_{10}$) was measured in accordance with ASTM D 1238-10, Condition 190° C./10 kg, Method A, and was reported in grams eluted per 10 minutes.

Gel Permeation Chromatography (GPC)

Samples were analyzed with a high-temperature GPC instrument (model PL220, Polymer Laboratories, Inc., now Agilent). Conventional GPC measurements were used to determine the weight-average molecular weight (Mw) and number-average molecular weight (Mn) of the polymer and to determine the molecular weight distribution, MWD or Mw/Mn. The z-average molecular weight, Mz, was also determined. The method employed the well-known universal calibration method based on the concept of hydrodynamic volume, and the calibration was performed using narrow polystyrene (PS) standards along with three 10 μm Mixed-B columns (Polymer Laboratories Inc, now Agilent) operating at a system temperature of 140° C. Polyethylene samples were prepared at a 2 mg/mL concentration in 1,2,4-trichlorobenzene solvent by slowly stirring the sample in TCB at 160° C. for 4 hours. The flow rate was 1.0 mL/min, and the injection size was 200 microliters. The chromatographic solvent and the sample preparation solvent contained 200 ppm of butylated hydroxytoluene (BHT). Both solvent sources were nitrogen sparged. The molecular weights of the polystyrene standards were converted to polyethylene equivalent molecular weights using a correction factor of 0.4316 as discussed in the literature (T. Williams and I. M. Ward, *Polym. Letters*, 6, 621-624 (1968)). A third order polynomial was used to fit the respective polyethylene-equivalent molecular weights of standards to the observed elution volumes.

Crystallization Elution Fractionation (CEF) Method

Comonomer distribution analysis is performed with Crystallization Elution Fractionation (CEF) (PolymerChar in Spain) (B Monrabal et al, Macromol. Symp. 257, 71-79 (2007)). Ortho-dichlorobenzene (ODCB) with 600 ppm antioxidant butylated hydroxytoluene (BHT) is used as solvent. Sample preparation is done with autosampler at 160° C. for 2 hours under shaking at 4 mg/ml (unless otherwise specified). The injection volume is 300 μl. The temperature profile of CEF is: crystallization at 3° C./min from 110° C. to 30° C., the thermal equilibrium at 30° C. for 5 minutes, elution at 3° C./min from 30° C. to 140° C. The flow rate during crystallization is at 0.052 ml/min. The flow rate during elution is at 0.50 ml/min. The data is collected at one data point/second. CEF column is packed by the Dow Chemical Company with glass beads at 125 μm±6% (MO-SCI Specialty Products) with ⅛ inch stainless tubing. Glass beads are acid washed by MO-SCI Specialty with the request from the Dow Chemical Company. Column volume is 2.06 ml. Column temperature calibration is performed by using a mixture of NIST Standard Reference Material Linear polyethylene 1475a (1.0 mg/ml) and Eicosane (2 mg/ml) in ODCB. Temperature is calibrated by adjusting elution heating rate so that NIST linear polyethylene 1475a has a peak temperature at 101.0° C., and Eicosane has a peak temperature of 30.0° C. The CEF column resolution is calculated with a mixture of NIST linear polyethylene 1475a (1.0 mg/ml) and hexacontane (Fluka, purum, ≥97.0%, 1 mg/ml). A baseline separation of hexacontane and NIST polyethylene 1475a is achieved. The area of hexacontane (from 35.0 to 67.0° C.) to the area of NIST 1475a from 67.0 to 110.0° C. is 50 to 50, the amount of soluble fraction below 35.0° C. is <1.8 wt %. The CEF column resolution is defined in the following equation:

$$\text{Resolution} = \frac{\text{Peak temperature of NIST 1475a} - \text{Peak Temperature of Hexacontane}}{\text{Half-height Width of NIST 1475a} + \text{Half-height Width of Hexacontane}}$$

where the column resolution is 6.0.

Melt Strength

Melt strength measurements were conducted on a Gottfert Rheotens 71.97 (Goettfert Inc.; Rock Hill, S.C.), attached to a Gottfert Rheotester 2000 capillary rheometer. The melted sample (about 25 to 30 grams) was fed with a Goettfert Rheotester 2000 capillary rheometer, equipped with a flat entrance angle (180 degrees) of length of 30 mm, diameter of 2.0 mm, and an aspect ratio (length/diameter) of 15. After equilibrating the samples at 190° C. for 10 minutes, the piston was run at a constant piston speed of 0.265 mm/second. The standard test temperature was 190° C. The sample was drawn uniaxially to a set of accelerating nips, located 100 mm below the die, with an acceleration of 2.4 mm/s². The tensile force was recorded as a function of the take-up speed of the nip rolls. Melt strength was reported as the plateau force (cN) before the strand broke. The following conditions were used in the melt strength measurements: plunger speed=0.265 mm/second; wheel acceleration=2.4 mm/s²; capillary diameter=2.0 mm; capillary length=30 mm; and barrel diameter=12 mm.

Dynamic Mechanical Spectroscopy (DMS)

Resins were compression-molded into "3 mm thick×1 inch" circular plaques at 350° F., for five minutes, under 1500 psi pressure, in air. The sample was then taken out of the press, and placed on a counter to cool.

A constant temperature frequency sweep was performed using a TA Instruments "Advanced Rheometric Expansion System (ARES)," equipped with 25 mm (diameter) parallel plates, under a nitrogen purge. The sample was placed on the plate, and allowed to melt for five minutes at 190° C. The plates were then closed to a gap of "2 mm," the sample trimmed (extra sample that extends beyond the circumference of the "25 mm diameter" plate was removed), and then the test was started. The method had an additional five minute delay built in, to allow for temperature equilibrium. The experiments were performed at 190° C. over a frequency range of 0.1 to 100 rad/s. The strain amplitude was constant at 10%. The complex viscosity η*, tan (δ) or tan delta, viscosity at 0.1 rad/s (V0.1), the viscosity at 100 rad/s (V100), and the viscosity ratio (V0.1/V100) were calculated from these data.

Differential Scanning Calorimetry (DSC)

Differential Scanning calorimetry (DSC) was used to measure the melting and crystallization behavior of a polymer over a wide range of temperatures. For example, the TA Instruments Q1000 DSC, equipped with an RCS (refrigerated cooling system) and an autosampler was used to perform this analysis. During testing, a nitrogen purge gas flow of 50 ml/min was used. Each sample was melt pressed into a thin film at about 175° C.; the melted sample was then air-cooled to room temperature (approx. 25° C.). The film sample was formed by pressing a "0.1 to 0.2 gram" sample at 175° C. at 1,500 psi, and 30 seconds, to form a "0.1 to 0.2 mil thick" film. A 3-10 mg, 6 mm diameter specimen was extracted from the cooled polymer, weighed, placed in a light aluminum pan (ca 50 mg), and crimped shut. Analysis was then performed to determine its thermal properties.

The thermal behavior of the sample was determined by ramping the sample temperature up and down to create a heat flow versus temperature profile. First, the sample was rapidly heated to 180° C., and held isothermal for five minutes, in order to remove its thermal history. Next, the sample was cooled to −40° C., at a 10° C./minute cooling rate, and held isothermal at −40° C. for five minutes. The sample was then heated to 150° C. (this is the "second heat" ramp) at a 10° C./minute heating rate. The cooling and second heating curves were recorded. The cool curve was analyzed by setting baseline endpoints from the beginning of crystallization to −20° C. The heat curve was analyzed by setting baseline endpoints from −20° C. to the end of melt. The values determined were peak melting temperature ($T_m$), peak crystallization temperature ($T_c$), heat of fusion ($H_f$) (in Joules per gram), and the calculated % crystallinity for polyethylene samples using: % Crystallinity=(($H_f$)/(292 J/g))×100. The heat of fusion ($H_f$) and the peak melting temperature were reported from the second heat curve. Peak crystallization temperature is determined from the cooling curve.

Film Testing

The following physical properties were measured on the films as described in the experimental section.

Total (Overall) Haze and Internal Haze: Internal haze and total haze were measured according to ASTM D 1003-07. Internal haze was obtained via refractive index matching using mineral oil (1-2 teaspoons), which was applied as a coating on each surface of the film. A Hazegard Plus (BYK-Gardner USA; Columbia, Md.) was used for testing. For each test, five samples were examined, and an average reported. Sample dimensions were "6 in×6 in."

45° Gloss: ASTM D2457-08 (average of five film samples; each sample "10 in×10 in").

Clarity: ASTM D1746-09 (average of five film samples; each sample "10 in×10 in").

2% Secant Modulus—MD (machine direction) and CD (cross direction): ASTM D882-10 (average of five film samples in each direction; each sample "1 in×6 in").

MD and CD Elmendorf Tear Strength: ASTM D1922-09 (average of 15 film samples in each direction; each sample "3 in×2.5 in" half moon shape).

MD and CD Tensile Strength: ASTM D882-10 (average of five film samples in each direction; each sample "1 in×6 in").

Dart Impact Strength: ASTM D1709-09 (minimum of 20 drops to achieve a 50% failure; typically ten "10 in×36 in" strips).

Oxygen transmission was measured via ASTM D-3985 via calibrated Mocon OX-TRAN® 2/21 unit at 23° C. and 0% relative humidity in cc-mil/100 sq.inch-day-atm.

Moisture vapor transmission rate was measured via ASTM F-1249 via a calibrated Mocon PERMATRAN-W® 700 unit at 38° C. and 100% relative humidity.

The present invention may be embodied in other forms without departing from the spirit and the essential attributes thereof, and, accordingly, reference should be made to the appended claims, rather than to the foregoing specification, as indicating the scope of the invention.

We claim:

1. A blown film comprising an ethylene/alpha-olefin interpolymer composition comprising greater than 80 percent by weight of units derived from ethylene and 20 percent or less by weight of units derived from one or more alpha olefin co-monomers, wherein said ethylene/alpha-olefin interpolymer has a density in the range of from 0.910 to 0.916 g/cm³, a melt index $I_2$ in the range of from 0.5 to 1.1 g/10 minutes, a melt flow ratio $I_{10}/I_2$ in the range of from 8 to 10, a melt strength in the range of from 3 to 6 cN, a highest temperature fraction in the range of from 8 to 15 percent determined by CEF, a highest peak temperature fraction by CEF in the range of from 96 to 100° C., and a lowest temperature fraction from CEF in the range of from 2 to 5 percent, and a DSC heat curve having three melting peaks with a highest temperature melting peak in the range of from 120 to 124° C., and a crystallinity in the range of from 40 to 50 percent.

2. The blown film of claim 1, wherein said blown film is characterized by having a Total Haze in the range of less than 20%; wherein said film has a 1 mil thickness, and said polyolefin composition further comprises one or more anti-block agents and one or more slip agents, and wherein said film is produced via a blown film process which has at least a 10 percent production rate increase over another ethylene based polymer having one or more properties outside of the required property ranges of the ethylene/alpha-olefin interpolymer composition.

3. The blown film of claim 2, wherein said another ethylene based polymer composition having a melt index outside of the required melt index range of the ethylene/alpha-olefin interpolymer composition.

4. The blown film of claim 1, wherein said blown film is characterized by having a Total Haze in the range of less than 20%; wherein said film has a 1 mil thickness and wherein said film is produced via a blown film process which has at least a 10 percent production rate increase over another ethylene based polymer having one or more properties outside of the required property ranges of the ethylene/alpha-olefin interpolymer composition.

5. The blown film of claim 1 comprising the ethylene/alpha-olefin interpolymer composition and one or more LDPEs or one or more LLDPEs.

6. An article comprising one or more layers, wherein at least one of said layers comprises the blown film of claim 1.

7. The article of claim 6, wherein the blown film comprises the ethylene/alpha-olefin interpolymer composition and one or more LDPEs or one or more LLDPEs.

8. The blown film of claim 1, characterized by an oxygen transmission rate in the range of from 600 to 800 cc-mil/100 sq. in-day-atm), measured at 23° C. and 0% relative humidity.

9. The blown film of claim 1, characterized by a moisture vapor transmission rate in the range of 1.1 to 1.4 gm-mil/100 sq.in-day at 38° C., 100% RH.

10. The blown film of claim 1, wherein the ethylene/alpha-olefin interpolymer composition has a melt index $I_2$ in the range of from 0.5 to 0.8 g/10 minutes.

11. The blown film of claim 1, wherein the ethylene/alpha-olefin interpolymer composition has a molecular weight distribution (Mw/Mn) of 3 to 5.

12. The blown film of claim 1, wherein the ethylene/alpha-olefin interpolymer composition has a melt flow ratio $I_{10}/I_2$ of 8.2 to 10.

13. The blown film of claim 1, wherein the ethylene/alpha-olefin interpolymer composition has a melt strength of 4 to 5 cN.

14. The blown film of claim 1, wherein the ethylene/alpha-olefin interpolymer composition is catalyzed using at least two catalysts and one or more co-catalysts.

15. The blown film of claim 14, wherein the at least two catalysts comprise a Ziegler-Natta catalyst and a catalyst comprising an s-indacenyl silanaminato complex of titanium.

16. The blown film of claim 15, wherein the at least two catalysts comprise titanium [N-(1,1-dimethylethyl)-1,1-dimethyl-1-[(1,2,3,3a,8a-η)-1,5,6,7-tetrahydro-2-methyl-s-indacen-1-yl]silanaminato(2-)-$_K$N][(1,2,3,4-η)-1,3-pentadiene] (CAT-B).

17. The blown film of claim 14, wherein the ethylene/alpha-olefin interpolymer composition is produced by solution phase polymerization using a dual reactor system.

* * * * *